May 7, 1963  J. E. RUZICKA  3,088,561
DAMPED STRUCTURES
Filed Nov. 6, 1958  4 Sheets-Sheet 2
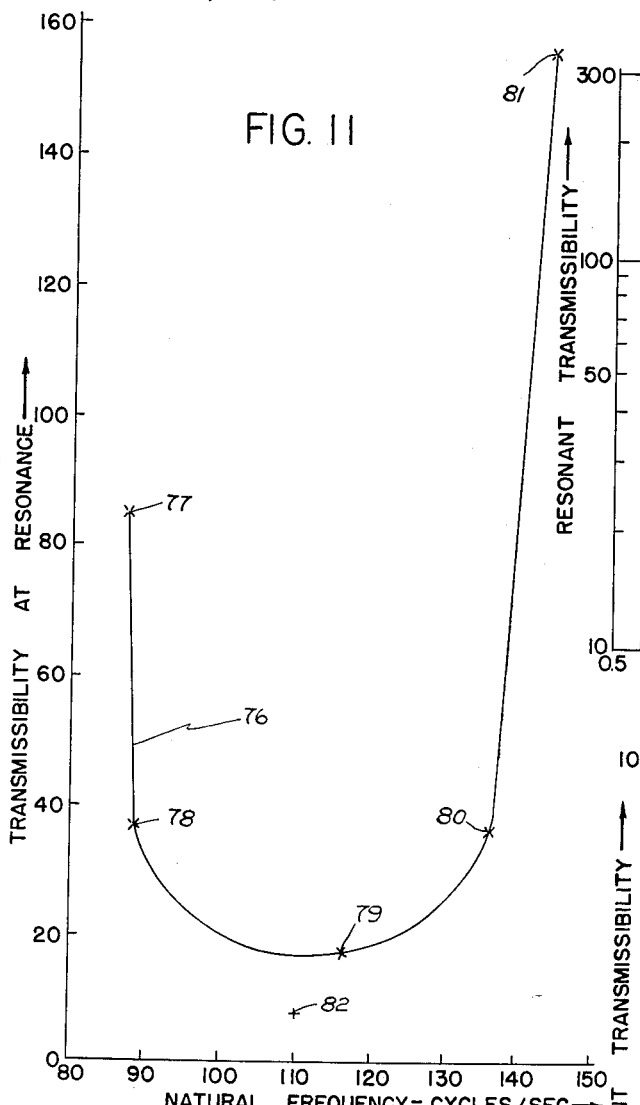
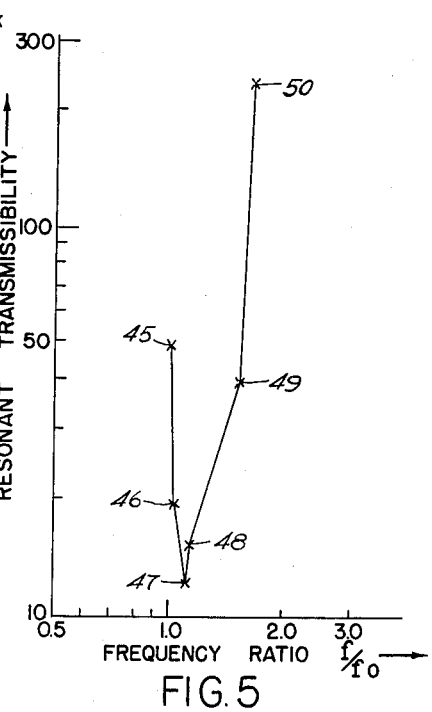
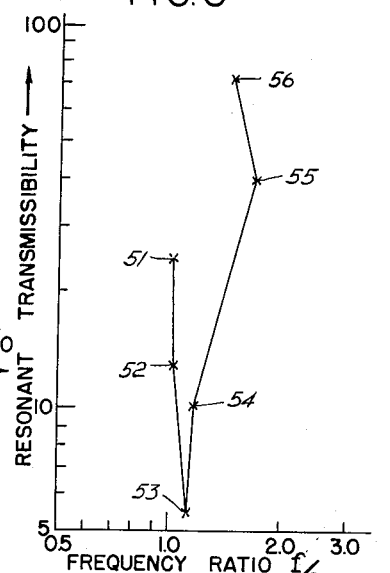
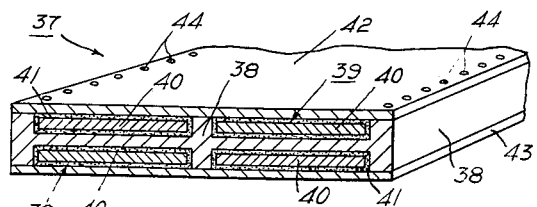
INVENTOR.
JEROME E. RUZICKA
BY
Dike, Thompson & Bronstein
ATTORNEYS May 7, 1963   J. E. RUZICKA   3,088,561
DAMPED STRUCTURES
Filed Nov. 6, 1958   4 Sheets-Sheet 3

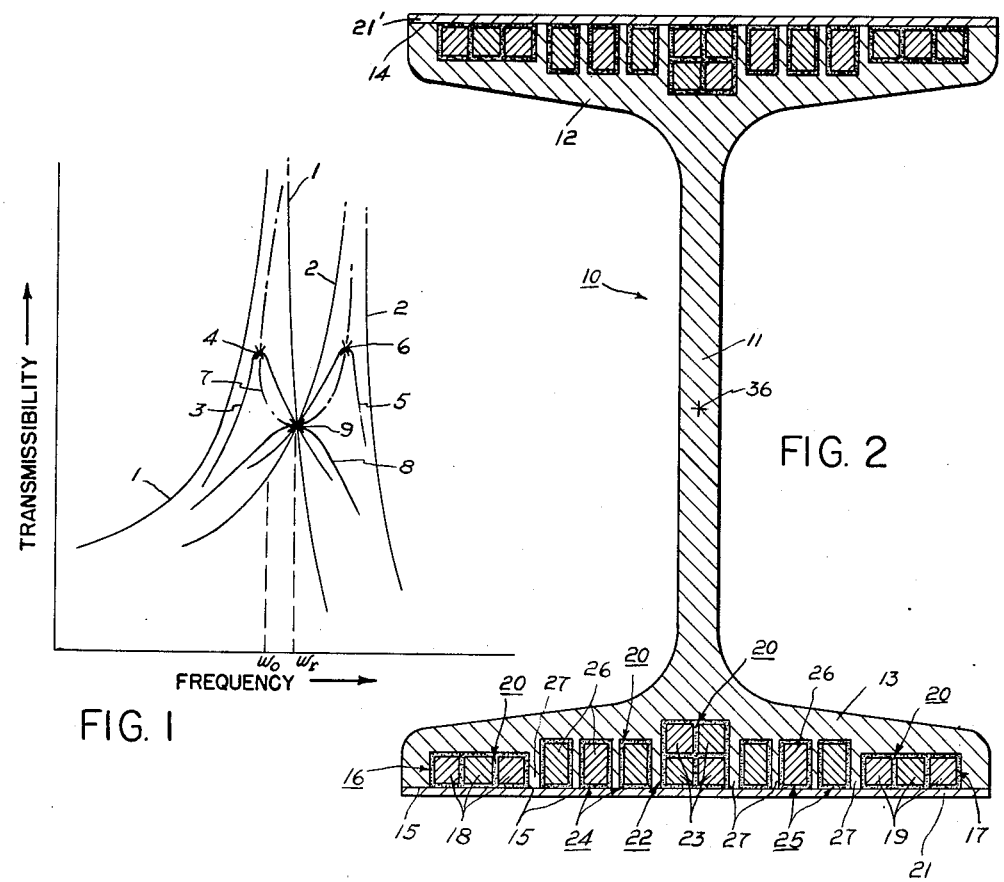

INVENTOR.
JEROME E. RUZICKA
BY
Dike, Thompson & Bronstein
ATTORNEYS

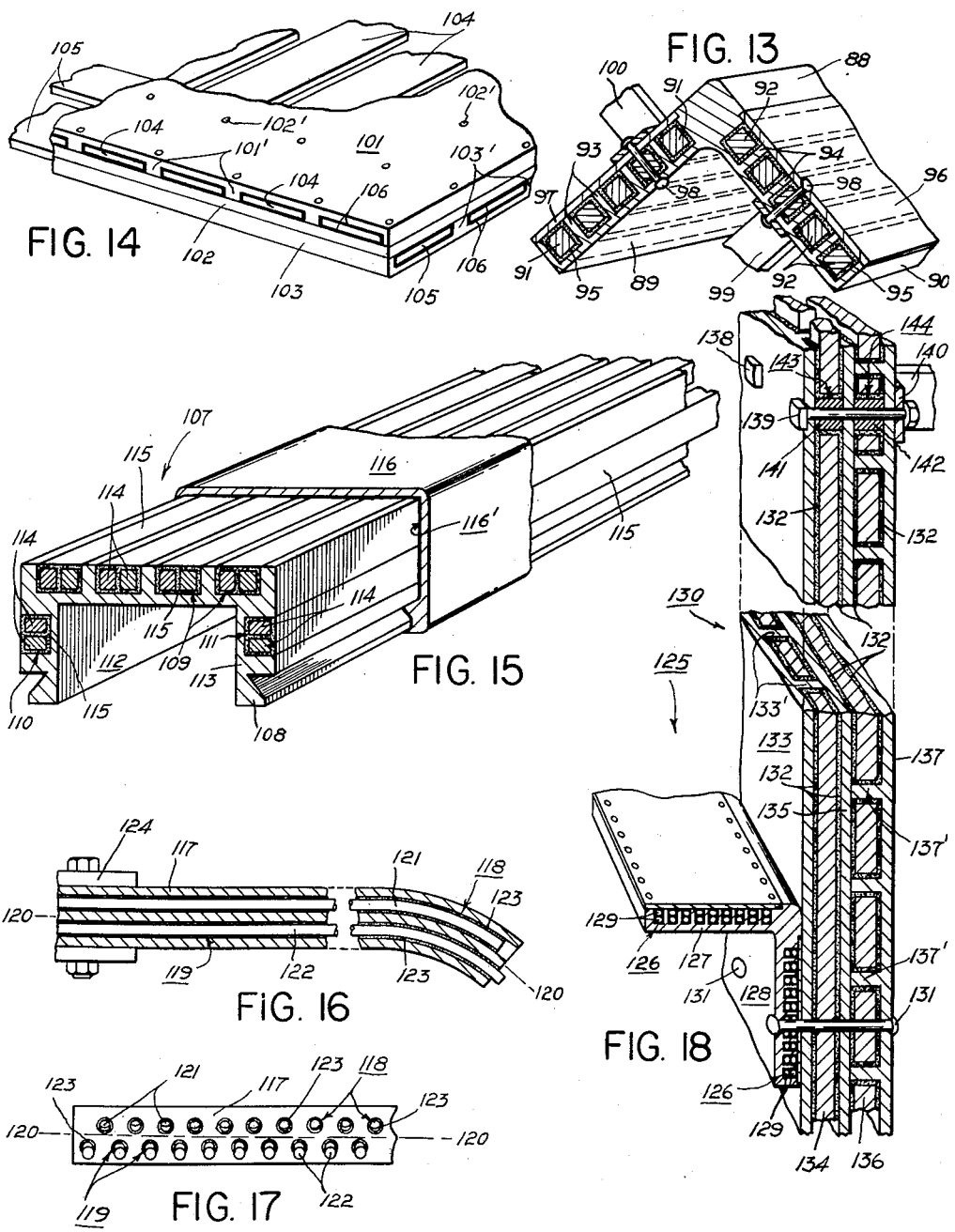

United States Patent Office 3,088,561
Patented May 7, 1963

3,088,561
DAMPED STRUCTURES
Jerome E. Ruzicka, Belmont, Mass., assignor to Barry Wright Corporation, Watertown, Mass., a corporation of Massachusetts
Filed Nov. 6, 1958, Ser. No. 772,382
20 Claims. (Cl. 189—37)

The present invention is concerned with improvement of the vibration characteristics of structures, and, in one particular aspect, with novel and improved composite structural components which are of substantial strength and yet highly self-damped against disturbing influences of vibration and the like.

Engineering design of apparatus and structures of various physical sizes and load-carrying capacities is often conveniently founded upon the well established characteristics of certain homogeneous constructional elements. Such elements readily lend themselves to rather uncomplicated mathematical analysis of their behavior, for example, and they are also attractive in that they are commercially available to the designer in a number of accepted basic dimensions and shapes. It often occurs, however, that the simple problem of withstanding relatively static stress and strain, be it in such diverse applications as a miniature apparatus or the massive frame of a building, becomes complicated by the highly involved problems of structural resonances and of suppressing induced or transmitted vibration or shock forces. In such cases, the construction either tends to become unduly rigid and bulky, without eliminating and, in fact, emphasizing, responses at certain frequencies, or it is connected with intricate accessory damping or isolating devices, or the construction is itself modified through the introduction of damping or isolating material which then tends to interrupt structural integrity or unity. For example, it is an established practice to insert elastic material between juxtaposed structural elements, and yet this practice not only may permit resonance conditions to occur in these elements, and fails to provide optimum dissipation of vibrational energy, but may constitute a structural weakness in relation to static loading. Similarly, it is known to interpose frictional damping materials such as felt or cork compositions between neighboring structural elements, although these may also introduce structural weaknesses and are subject to deformation under loading, particularly where they must be formed in relatively thick layers.

In accordance with teachings of the present invention, however, need for accessory damping equipment may be wholly eliminated in many devices, or may be limited to minor damping roles in other instances. Major structural components are themselves formed such that they possess remarkably high damping of substantially optimum value, as well as other advantageous vibration and shock characteristics. Such components are essentially immune to occurrence of dangerous resonance conditions, and are less susceptible to fatigue failures. As is detailed later herein, the resulting improved composite structural components well lend themselves to manufacture with conventional external configurations and with other physical and operational properties enabling them to be readily introduced in lieu of prior forms of homogeneous elements.

Accordingly, it is one of the objects of the present invention to provide improved composite structural members in which self-damping characteristics provide optimum suppression of maximum responses at and near natural resonance.

A further object is to provide improved structural components of novel composite construction which have particularly advantageous characteristics under vibration conditions and which facilitate low-cost fabrication of damped structures.

An additional object is to provide self-damped components for construction purposes wherein provision is made to develop certain unique relative damping movements which efficiently dissipate energy of vibration and the like.

A yet further object is to provide structural components of novel and improved composite construction in which fatigue life is materially prolonged.

It is also an object to provide improved damped structural members which are fabricated of plural materials having differing moduli of elasticity and which are distinctively associated with one another and with a specially distributed permanently viscous medium to occasion optimum dissipation of applied vibration forces.

By way of a summary account of practice of this invention in one of its aspects, an elongated basic constructional member having a conventional external geometry, such as that of a common I-beam, is prepared, as by extrusion, from a first material having a relatively low modulus of elasticity. Either through a separate machining operation, or in the course of initial extrusion or alternative forming, the member is provided with a plurality of parallel longitudinal slots or other openings of relatively small cross-section which are preferably distributed to avoid creation of points or positions of major structural weakness in the member itself. Within each of the longitudinal openings is disposed one or more inserts in the form of rods which complement the cross-section thereof and which substantially fill the openings except for intended slight clearances between the adjacent surfaces of the rods and basic constructional member. The rod inserts preferably possess an appreciably higher modulus of elasticity than the member into which they are fitted, and the use of steel and an aluminum alloy as the two materials characterizes one acceptable difference between them in this respect. Intermediate the outer surfaces of the rod inserts and the proximate inner surfaces of the accommodating openings is disposed a permanently-viscous and non-elastic medium in which high viscous shear forces are developed upon occurrence of even minute relative sliding movements between the inserts and the associated basic constructional member as the latter receives transcient shock or sustained vibratory forces. Tendencies for the composite beam to resonate with potentially destructive amplitude are suppressed to an optimum degree through critical relationship of the viscosity characteristics of the damping medium to the moduli of elasticity and geometry of the basic member and inserts.

Although the features of this invention which are believed to be novel are set forth in the appended claims, greater detail of the invention in its preferred embodiments as well as the further objects and advantages thereof may be readily comprehended through reference to the following description taken in connection with the accompanying drawings, wherein:

FIGURE 1 is a graphical representation of certain vibration transmissibility characteristics related to impressed vibration frequency occurring with structures such as those to which these teachings may be applied;

FIGURE 2 depicts a transverse cross-section of a self-damped composite I-beam in which teachings of this invention are practiced;

FIGURE 3 illustrates a vibration analysis arrangement for the derivation of performance data for the beam of FIGURE 2;

FIGURE 4 is a sectioned pictorial view of part of a generally flat constructional member incorporating self-damping provisions;

Figure 12:
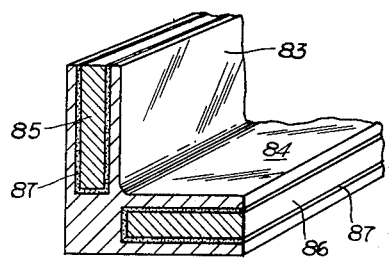
Figure 7:
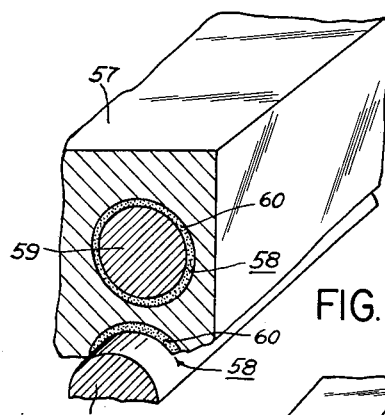
Figure 8:
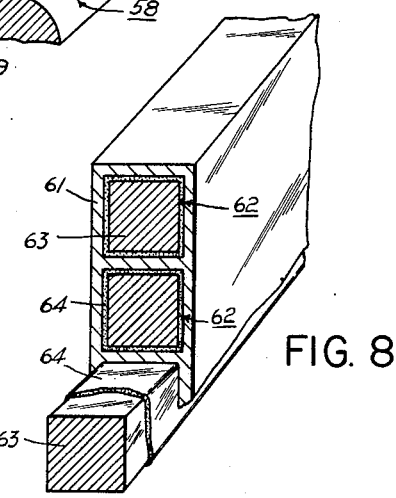
Figure 9:
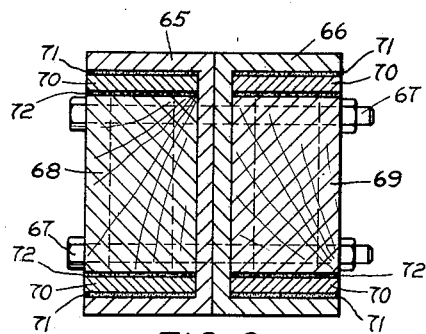
Figure 10:
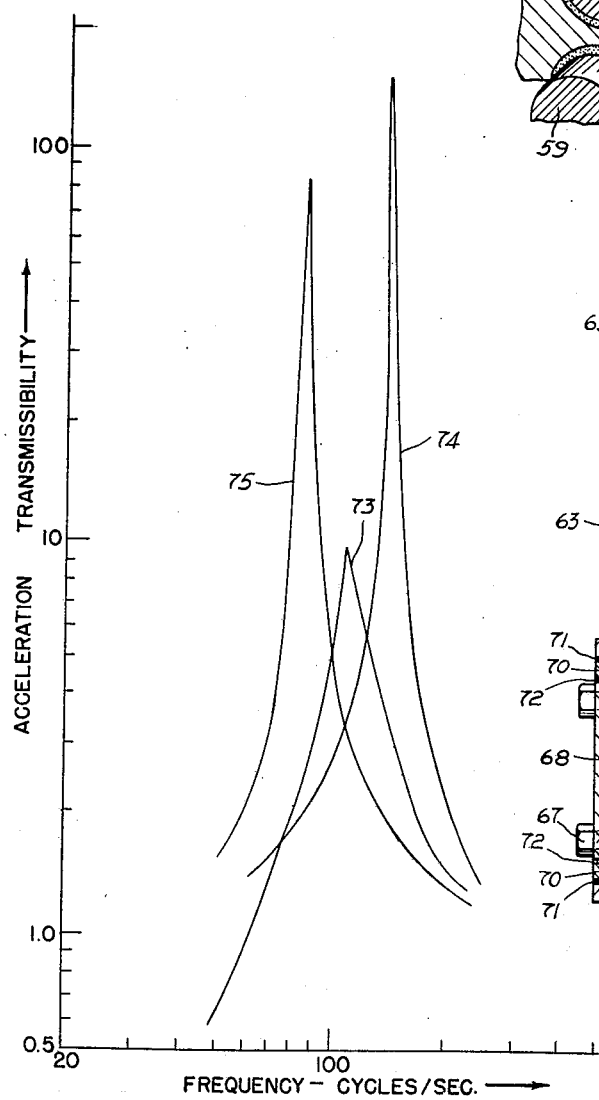

FIGURE 5 plots peak resonant response data for a member like that of FIGURE 4 with damping media of different viscous shear characteristics;

FIGURE 6 is a plot comparable to that of FIGURE 5, characterizing performance of a member which supports a load at one end;

FIGURE 7 provides a cross-section of part of a self-damped structural member including elongated cylindrical inserts;

FIGURE 8 illustrates part of a self-damped structural member including rod inserts of square cross-section;

FIGURE 9 is a transverse cross-section of a damped composite beam which is fabricated of wood, metals, and a permanently-viscous non-elastic damping medium;

FIGURE 10 graphically portrays acceleration transmissibility characteristics of a damped beam such as that of FIGURE 9;

FIGURE 11 graphically portrays maximum transmissibility vs. frequency characteristics of a beam construction such as that of FIGURE 9 employing a variety of damping media;

FIGURE 12 depicts a damped angle-shaped structural member;

FIGURE 13 portrays a self-damped composite angle member having mounting brackets and fasteners associated therewith;

FIGURE 14 illustrates a damped structural plate member having multiple inserts associated with channelled core elements;

FIGURE 15 is a sectioned pictorial representation of part of a damped channel member;

FIGURE 16 represents a transverse cross-section of a self-damped composite member undergoing bending movement, with relative displacements between certain elements exaggerated for purposes of clarity;

FIGURE 17 is an end view of the structural member shown in FIGURE 16; and

FIGURE 18 illustrates associated damped plate and angle members, together with fastening provisions which avoid impairment of damping characteristics.

Homogeneous constructional elements, of which a solid I-beam is typical, possess natural circular frequencies for free vibration which depend upon the particular geometry and material which are involved. Free vibration in such elements is commonly of a transient character, being damped gradually by the internal resistance of the material, although, if the exciting forces are alone of a sufficient magnitude or if sustained exciting forces are of periodicity near the natural periodicity of an element and exceed the energy lost through internal resistance, the vibration can become intense. And, as is well known, when the frequency of the exciting forces and the natural frequency of free vibration of the element coincide, the resulting resonance condition can involve large magnifications of motion which are of a destructive nature. One illustration of such effects appears from a graphical representation of magnification or transmissibility characteristics, i.e., the ratio of amplitude of induced vibration to amplitude of exciting vibration, in relation to exciting frequency. Considering the FIGURE 1 plot, wherein the frequency appears along the abscissa, curve 1 characterizes response characteristics of a homogeneous undamped beam, the magnification at resonance theoretically approaching infinity and, in practice, reaching a very high value. In practical design, it is sought to avoid such resonance and to employ structural members of such dimensions and material that they function only within lowest levels of their magnification curves. This signifies, of course, that in some applications one may find it necessary to incorporate a costly and unwieldy bulk and strength of materials which are actually much in excess of the static loading requirements alone. For example, a comparable I-beam of twice the cross-section already considered could have a characteristic such as that of curve 2, which has its resonance peak shifted or tuned to a higher frequency well beyond a lower range of interest in a given application, although the increased weight and size would otherwise be wasteful when the static loading to be experienced is only the same as could be satisfied by the beam of lesser cross-section. By way of distinction, however, practice of the present invention permits more efficient and economic use of material which affords the principal structural strength needed to withstand given static loads, the resonant magnifications being avoided other than by mere multiplication of size.

Other prior efforts at improvement have been in the direction of structural isolation, that is, in the direction of preventing excessive exciting forces from reaching the troublesome structural elements in the first place. This result may be approached through practice of suspension, as with supports having desired elasticity. Isolation may also be approached through simple damping, as by absorbing energy of vibration and shock in special pads or in accessory dashpot-like constructions which tend to dissipate the absorbed energy. Suspension springs, rubber layers, pads of felt and cork composition, and dashpots, are commonly-encountered examples of these practices. Yet, it is apparent that the usual elastic and absorbent materials are themselves yieldable and lack structural strength needed at certain positions where major loads are to be withstood. When such materials are interposed between principal structural elements, they can thus introduce weaknesses disturbing overall constructional strength and rigidity even under static loading conditions. Dashpot-like assemblies also have only very limited fields of use, of course. These practices are further imperfect in that the isolated elements nevertheless each inherently possess capacity to magnify or resonate, and such forces as can be transmitted either through the isolating substances or through other coupled or surrounding media will tend to induce unwanted movement or vibration. In the latter instances, the wholly yieldable character of the supporting isolation material may in fact facilitate certain undesired modes of vibration which could not occur if the suspension were stiff.

Difficulties of the foregoing type are avoided in accordance with the present invention through practices which recognize that improved damping effects may be evidenced by individual structural elements themselves, and under all expected environmental conditions, when they are assembled in a particular composite fashion and utilize materials having characteristics which are in unique relationship. As is discussed more fully later herein, preferred constructions make highly advantageous use of permanently viscous media distributed at interfaces between certain parts of a composite assembly which are specially arranged to develop accentuated relative movements under vibration conditions. Optimized conditions are produced at which maximum permissible magnification is suppressed to wholly acceptable levels. By way of preliminary explanation of general effects which are present, let the aforesaid regular I-beam construction be considered once again. In the case of a simple beam of a first cross-section, the response characteristic of curve 1 is obtained. And, if a second, and identical, beam is separated from the first by a layer of space, gaseous medium, or the like, the two beams of course function independently in response to applied vibration forces. A system of the two I-beams, or any number of such beams, thus possesses the same characteristic represented by curve 1. Considering next the aforementioned case where the single homogeneous beam is replaced by another like I-beam of twice, or some other multiple of, the cross-section, then the natural frequency of the system becomes correspondingly multiplied. Curve 2 represents this condition, and it is perceived that the maximum peak response is shifted in frequency but not diminished in amplitude. If like beams of intermediate cross-sectional sizes are evaluated, the response peak merely shifts to some position intermediate the peaks of curves 1 and 2, and there would be no appreciable difference in maximum magnification.

However, when the simple I-beam is next transformed into the composite self-damped construction viewed in cross-section in FIG. 2, the dynamic behavior becomes altered remarkably and advantageously. Its optimized response characteristic, of the type represented by curve 8 in FIGURE 1, not only possesses a low finite peak of magnifications but is also desirably broad and flattened near its maximum point 9. Further, substantial isolation effects are achieved at high frequencies, as is indicated by the trend of curve 8. Referring to details of construction of this preferred embodiment appearing in FIGURE 2, it will be observed that the transverse cross-section of the improved I-beam structural element 10 possesses a conventional external configuration. This element corresponds to a standard three-inch beam, in which the stem 11 and connecting inner portions of the cross-legs 12 and 13 are rigidly-united parts of a core portion and are of solid aluminum alloy. Outermost surfaces 14 and 15 of the cross-legs 12 and 13 respectively, are channelled along nine paths longitudinally of the beam to form passageways of rectangular cross-section enveloping a plurality of steel rod inserts, also preferably of rectangular or square cross-section. Inasmuch as the two cross-legs are of identical construction in the figure, specific reference is made to details of the fabrication of the lower cross-leg, and it will be understood that the upper leg is comparable. Widest channels 16 and 17, near the outer extremities, each receive three steel inserts, numbered 18 and 19 in these two occurrences, in side-by-side relationship, the dimensions being such that these inserts very nearly fill the channels but do not project beyond the surface 15. The inserts extend along the channel paths for substantially the full length of the beam, without interruption. Intermediate the adjacent surfaces of the inserts, and at the interfaces between the inserts and proximate surfaces of channels 16 and 17, is disposed a permanently viscous material 20 of substantially optimum viscosity characteristics discussed later herein. Except for effects of this material, the inserts are not otherwise fixed longitudinally in place within the channels; they are not bolted or similarly fastened, for example. Aluminum end or cover plate 21, which is rigidly fastened to the beam fully across the surface portions 15, aids in retaining the inserts, prevents loss, contamination, or deterioration of the viscous medium, and presents inner surfaces separated from the inserts by medium 20. The opposite end plate 21' is similarly disposed across the end surfaces 14 of cross-leg 12.

Deeper center channel 22, which like the other channels forms a closed cell in association with end plate 21, receives four like steel inserts 23, each separated from one another and from inner surfaces of channel 22 and plate 21 by the permanently viscous medium 20. Laterally on each side of channel 22, there is disposed a group of three like channels, 24 and 25, respectively, of intermediate depth and each including a single rectangular steel insert, such as inserts 26, similarly surrounded by the permanently viscous medium 20. It will be observed that the comb-like arrangement of the aluminum partitions 27 integral with the cross-leg 13 is one which affords particularly large total interface area between the aluminum and steel members. This is desirable for increasing dissipation of energy of vibration in some applications, and it also aids in improving structural strength of various portions of the beam and in maintaining desired dimensions of the damping medium layers. In one construction, the various dimensions accommodated the illustrated distribution of the permanently viscous medium, throughout the beam, with thickness of but a few thousandths of an inch.

Modulus of elasticity characteristics of the basic structural material, aluminum, and of the steel inserts are considerably different, of course, and this factor is found to introduce advantageous damping characteristics which are in addition to those occasioned by the permanently viscous medium and the arrangement of channels and inserts. Statically, the illustrated beam may be somewhat altered in structural strength due to the channelling and substitution of material of the steel inserts; however, if this becomes important, any static strength requirement may of course be met through simple changes in the basic geometry of the beam. Dynamically, however, the response characteristics are dramatically improved, and, when substantially optimum viscosity characteristics of the permanently viscous material are present, the dynamic behavior is optimum. Further reference to the general characteristic curves of FIGURE 1 aids in understanding the influence of viscosity of the damping material upon dynamic behavior. For example, curve 1 may be taken to represent the condition of zero viscosity, the basic core section including stem 11, cross-legs 12 and 13, and cover plates 21 and 21', then behaving independently and as though the inserts were not present at all. The peak resonant transmissibility at frequency $\omega_0$ would then be very high. When the viscosity of the damping medium layers is considered to be essentially infinite, such that the inserts and basic core section are frozen together, the peak resonant transmissibility at some higher frequency is again very high, as may be characterized by curve 2. If next the coefficient of viscosity is chosen at a low value, it is found that the resulting response curve, such as that identified by reference character 3, possesses a relatively high finite peak value 4. A much larger coefficient of viscosity yields a response pattern 5 the peak 6 of which is also finite and relatively high, and which occurs at a higher frequency. In general, the peak values for increasing coefficient of viscosity follow the pattern of dashed-line curve 7. When a coefficient of viscosity at a critical intermediate value is present, the peak response is at an optimum minimized low value and the curve of magnifications 8 becomes broad and flattened near its maximum point 9 at resonant frequency $\omega_r$.

Evidence of the foregoing type of behavior is established utilizing the vibration equipment and mode of support represented in FIGURE 3, for example. There, the I-beam 10 is shown cantilevered at its mid position by a clamp 28 upon the vertically movable output member 29 of an electrodynamic shaker 30, the latter being of a known form of construction and operation and being mounted in turn upon rigid base members 31. Free cantilever length 32 on each side of the clamp was established at thirty inches, the fixed beam height 33 being measured at three inches. Deflections of the shaker output member having the vertical orientation 34 were regulated, and related excursions 35 of the beam end were measured, for the cases of the described composite beam and of a solid aluminum beam having like outer dimensions and geometry. Investigating the dynamic responses had when the permanently viscous medium 20 is, significantly, of approximately optimum viscosity characteristics for the composite construction involved, the measurement data indicates that resonant frequency is in fact of expected optimum value and that resonant transmissibility (end movement 35/applied motion 34) is vastly improved in relation to that which occurs with a comparable solid beam:

| Item | Damping medium | Resonant frequency, c.p.s. | Applied motion, inch | Resonant transmissibility |
|---|---|---|---|---|
| 1a. Solid beam | None involved | 135 | 0.001 | 285 |
| 1b. Solid beam | do | 135 | 0.002 | 110 |
| 1c. Solid beam | do | 135 | 0.005 | 90 |
| 2a. Damped beam | Silicone oil, 500,000 centistokes | 115 | 0.001 | 16 |
| 2b. Damped beam | do | 115 | 0.002 | 13+ |
| 2c. Damped beam | do | 110 | 0.005 | 10+ |
| 2d. Damped beam | do | 105 | 0.010 | 9+ |
| 3a. Damped beam | 700,000 centistokes | 110 | 0.001 | 10 |
| 3b. Damped beam | do | 105 | 0.002 | 9 |
| 3c. Damped beam | do | 100 | 0.005 | 7− |
| 3d. Damped beam | do | 90+ | 0.010 | 7− |

These data demonstrate that the damped beams each possess a resonant frequency which is essentially that (114 c.p.s.) which is a theoretical optimum. The solid beam possesses a high resonant frequency, and exhibits resonant transmissibility over the range of 90 to 285 for the applied motions noted. By way of distinction, the two damped beams each exhibit very much lowered transmissibility; one over the range of 9+ to 16, and the other over the range of 7− to 10.

Addition of a sixty-five pound concentrated weight to each end of the cantilevered beam yielded the following data with the same apparatus:

| Item | Damping medium | Resonant frequency, c.p.s. | Applied motion, inch | Resonant transmissibility |
|---|---|---|---|---|
| 1a. Solid beam | None involved | 26 | 0.001 | 140+ |
| 1b. Solid beam | do | 26 | 0.002 | 120 |
| 1c. Solid beam | do | 25 | 0.005 | 70+ |
| 2a. Damped beam | Silicone oil, 500,000 centistokes | 25 | 0.001 | 8 |
| 2b. Damped beam | do | 25 | 0.002 | 7 |
| 2c. Damped beam | do | 23 | 0.005 | 5+ |
| 2d. Damped beam | do | 25 | 0.010 | 5+ |
| 3a. Damped beam | 700,000 centistokes | 25 | 0.001 | 6+ |
| 3b. Damped beam | do | 24 | 0.002 | 6− |
| 3c. Damped beam | do | 21 | 0.005 | 5 |
| 3d. Damped beam | do | 20 | 0.010 | 6+ |

From these results, it will be perceived that the resonant transmissibility characteristics are likewise vastly improved in the cases of the damped beams under conditions of end loading. Whereas the measured resonant transmissibility range extends from 70+ to 140+ in the case of the solid beam, it extends but from 5+ to 8 and from 5 to 6+ in the two improved damped beam constructions.

The complex actions which occasion improved damping include those of viscous shear in the damping medium. As has been mentioned, the various inserts which extend longitudinally the full length of the beam are not rigidly fastened to each other or to the beam at end or intermediate points, and, having bending characteristics which are different from that of the basic core of the beam, they tend to slip longitudinally in relation to the basic beam core as flexural movements are experienced responsive to applied excitation of vibratory character, that is, responsive to transient or sustained forces or motions which cause vibration. At such times, the inserts do not undergo the same compression and expansion as do the adjacent portions of the core, all parts of which are integral, and this relationship contributes to enhanced damping. For example, if the ends of I-beam 10 in FIGURE 3 are both depressed downwardly in relation to the center clamping position, the beam becomes curved and the material of the lower cross-leg 13 is stressed. Integral partitions 27, which are substantially rigidly united with other parts of the basic aluminum core portion including stem 11 and cross-legs 12 and 13, are stressed but are not free to slip, while the adjacent stiffer inserts 26 remain relatively unstressed and become curved without appreciable shortening in length. Therefore, there occurs a relative slip between adjacent surfaces of the inserts and core portion. Effects at the top flange or cross-leg 12 are of opposite sense. While slippage is minute, it occurs across large total areas and occasions substantial and rapid dissipation of energy through the viscous shearing effects. Because of the nature of these actions, the slippage between adjacent surfaces of the inserts is of lesser value than that between adjacent surfaces of the inserts and core material, which indicates that the groups of three square-section inserts 18 and 19 may each be replaced by one insert of wide rectangular cross-section, as convenience decides. Similarly, one insert of large square cross-section may be employed in lieu of the four smaller inserts 23. The open-sided passageways exemplify that inserts need not be wholly enveloped by the core portion, and they may of course project laterally outwardly beyond the core. Conversely, the individual inserts illustrated may each be subdivided into elements of yet smaller cross-section, such as that of small steel wire, if it is preferred to group such wires together in fabricating inserts. In each case, the inserts are laterally interlocked or mated with the core in a plurality of directions and thus can develop damping movements of the composite member in a plurality of planes of movement. Symmetrical distribution of the multiple inserts, and distribution at positions not seriously interrupting the major structural strength of the core, are preferable. And, because of the origins of most important damping action at locations of maximum relative slip, the inserts should be disposed at locations removed as far as possible from the neutral axes of bending movements. Thus, in the FIGURE 2 and FIGURE 3 arrangement, the inserts are removed as far from the longitudinal neutral bending axis 36—36 as the geometry and presence of closure plates will permit. A widespread distribution of inserts is also important in that then only a few are likely to be shorted out by bolts or other fasteners connected with the beam. As is further discussed later herein in connection with other embodiments, the inserts may nevertheless be shorted or fastened to the cell material at certain support positions without substantially impairing the damping efficiencies, the clamping in the vibration arrangement of FIGURE 3 being illustrative of this. Also, where a predetermined pattern of punchings or other openings for fasteners is provided, the inserts may be distributed or shaped to avoid shorting at the positions of these openings. The same permanently viscous damping medium may be employed throughout any one construction, or varied at different insert positions.

Another practice of the self-damped composite core and insert construction is portrayed in FIGURE 4, wherein a beam 37 of rectangular cross-section is chosen. The aluminum alloy inner core member 38 is there provided with four symmetrically-disposed passageways in the form of shallow grooves 39, two on each of the wider sides, within each of which is mated one of the four thin strip steel inserts 40, also of rectangular cross-section. Permanently viscous damping medium 41 surrounds each strip insert, and aluminum alloy cover plates 42 and 43 are substantially rigidly united with parts of the inner core member 38 by fasteners 44 which insure that the cover plates function as part of a unitary core portion during flexural movements of the beam.

Performing vibration analyses with a solid aluminum beam and a beam of this self-damped construction, both measuring ½″ x 3″ and the steel strips measuring ⅛″ x 1⅛″ in cross-section, and utilizing the vibration equipment and mode of support viewed in FIGURE 3, the data plotted in FIGURES 5 and 6 was secured. Input displacement excitation of the electrodynamic shaker was maintained constant at 0.010 inch throughout each set of evaluations. For the case of a double-overhang cantilevered mounting, with the two ends of the beam extending free and unloaded for twenty inches, the theoretical calculations of resonant frequency for the undamped beam, for the solid or infinitely-damped beam, and for the beam with optimum damping, yielded 24, 42 and 29.6 cycles per second, respectively. Test data results of 22.5, 34.5 and 25 cycles per second, respectively, were in general agreement. The tabulation which follows has reference to the FIGURE 5 plot of data taken under the aforesaid conditions, the abscissa there being in terms of the ratio of excitation frequency $f$, to the undamped natural frequency, $f_0$.

| Point on Fig. 5 | | Damping material | Resonant frequency, c.p.s. | Resonant transmissibility |
|---|---|---|---|---|
| a | 45 | Light oil 500 centistokes | 22.5 | 50 |
| b | 46 | Heavy oil, 450,000 centistokes | 23 | 19 |
| c | 47 | Coated paper layer, 0.003″ thick 1,000,000 centistokes. | 25 | 12 |
| d | 48 | Coated paper layer, 0.003″ thick plus extra bolts stiffening the core. | 25 | 16 |
| e | 49 | Infinite; inserts bolted to core | 34.5 | 40 |
| f | 50 | Solid aluminum beam | 37.5 | 230 |

The layer referred to is paper coated on both sides with a damping medium, exhibiting a coefficient of viscosity of about 1,000,000 centistokes, and having about the same thickness as that of the oil layers employed.

The comparable plot in FIGURE 6 involves results obtained with identical beams each having a concentrated end loading weight of twenty-five pounds. Theoretical resonant frequencies of 5.3, 9.4 and 6.5 cycles per second for the zero-damped, infinitely-damped, and optimum-damped cases, respectively, were in general agreement, again, with the measured resonant frequency values of 5, 8+ and 5.5 cycles per second. Tabulation is made of the data as follows:

| Point on Fig. 6 | | Damping material | Resonant frequency, c.p.s. | Resonant transmissibility |
|---|---|---|---|---|
| a | 51 | Light oil 500 centistokes | 5 | 25 |
| b | 52 | Heavy oil, 450,000 centistokes | 5.5 | 13 |
| c | 53 | Coated paper layer, 0.003″ thick 1,000,000 centistokes. | 5.5 | 5.5 |
| d | 54 | Coated paper layer, 0.003″ thick plus extra bolts stiffening the core. | 5.5 | 10 |
| e | 55 | Infinite; inserts bolted to core | 8+ | 40 |
| f | 56 | Solid aluminum beam | 7 | 75 |

Improvement in both instances is immediately perceived from the plots in FIGURES 5 and 6, although still further suppression of maximum resonant transmissibility could be expected with yet a more optimum damping medium.

The sectioned illustrations of self-damped composite structural fragments in FIGURES 7 and 8 concern two preferred configurations of inserts and accommodating passages. Core structure 57, in FIGURE 7, represents an integral part of the basic structural material of a load-supporting element, and is provided with relatively small elongated cylindrical openings 58 which preferably extend the full length of the element. Such openings may readily be made very small and yet lengthy, and with a high degree of precision, through practice of known extrusion techniques, for example. The cooperating inserts 59 are preferably of circular cross-section, are generally smooth on their exteriors, and are preferably of material having a higher modulus of elasticity than does the material of core 57. Permanently viscous damping material 60 occupies the very thin annular spaces between insert and core material, the coefficient of viscosity thereof being that which produces substantially optimum damping effects. A film of properly viscous material having a thickness of but a few thousandths of an inch is advantageous. In this connection it is significant to note that important viscosity damping effects are dependent upon the shearing rate within the film, and, for any given velocity of relative displacement between opposing surfaces separated by a viscous medium, the shearing rate will increase as the separation decreases. High shearing rates are thus promoted by small dimensions such as those of films. Further, the inserts which occasion the damping are not fastened either to the associated core or to one another, although it is obviously necessary that these inserts be restrained from inadvertent large displacements or slipping entirely outside the core. This restraint is amply provided by certain thin heavily-viscous films of damping medium, the effects of molecular adhesion to the insert and core walls being added to effects of the high shear rate phenomenon in developing this restraint.

In FIGURE 8, the illustrated section of basic core material 61 is provided with longitudinal openings 62 of square cross-section, and the inserts 63 are of like cross-section and of minutely smaller dimensions which enables the damping medium 64 to be disposed intermediate adjacent insert and core opening surfaces. This configuration is one yielding desirably large total surface areas for production of high damping. Coulomb damping effects, which occur when the adjacent surfaces actually contact one another, aid the suppression of resonance and vibration transmission also, provided the coulomb damping effects are proportioned to yield substantially optimum damping. Hexagonal, octagonal, and other cross-sections may obviously be employed, and more than one configuration of core opening and insert may appear in a single composite element. As is evident from the FIGURE 1 construction, individual inserts need not be of cross-sectional dimensions comparable to those of the accommodating core openings, particularly where a plurality of inserts appear in one opening.

The beam structure shown in FIGURE 9 includes a core portion which is itself of composite construction in that its central aluminum I-beam section is fabricated from two like extruded aluminum channel members 65 and 66 fastened together in back-to-back relationship by bolts 67 which also rigidly secure these members with the wood members 68 and 69 disposed within the channel recesses of the members 65 and 66, respectively. All parts of the wooden and aluminum core members are substantially rigidly united and not only function together in withstanding the static loadings but also function as one core portion in developing relative longitudinal slip with certain insert members under dynamic flexural movement of the beam. Channel recesses of members 65 and 66 are not fully occupied by wooden core members 68 and 69, however, the latter each being of lesser rectangular cross-section which leaves spaces at each side thereof to be at least partly filled by mated strip inserts having a higher modulus of elasticity than either the wood or aluminum core sections. Four such steel strip inserts 70, are portrayed symmetrically disposed in the spaces between the aluminum cross-legs and wood members, and permanently-viscous damping medium films 71 and 72 appear at eight positions intermediate the steel strips and aluminum cross-legs. Adhesive characteristics of the films prevent the steel inserts from becoming dislodged, although retention may of course be aided by extending the wood members 68 and 69 such that their sides make light contact with the steel strips.

Measurements of characteristics of the FIGURE 9 fifty-inch composite beam were performed as it was vibrated by an electrodynamic shaker while cantilevered with a double overhang (such as is illustrated in FIG. 3) in the amount of twenty-four inches on each side of the shaker support. A calculated optimum resonant frequency of 158 cycles per second was closely approached using a layer of the aforesaid doubly-coated paper applied under pressure of 4.1 pounds per square inch. This response appears as curve 73 in FIGURE 10, wherein the transmissibilities under applied acceleration of 1.0 G are plotted against the applied frequency (abscissa). Curve 74 represents the response characteristic when the steel insert strips are bolted fast with the aluminum core member, and corresponds to an infinite damping condition. A very low or zero damping condition is indicated in the plot of curve 75, prepared using a compound having a coefficient of viscosity of about 10,000 centistokes applied under 2.0 pounds per square inch pressure and allowed to set for one hour.

The manner in which maximum transmissibility at resonance is found to vary with the damping medium characteristics is presented in FIGURE 11 for the case of the FIGURE 9 beam structure, the transmissibility (ordinate) there being plotted against frequency for a number of damping materials. For the materials and conditions thereof under which one series of investigations was made, a characteristic curve of the general type designated by reference character 76 was established. Point 77 corresponds to the resonant peak of curve 75 in FIGURE 10, and represents an essentially zero damping condition. Utilizing a motor oil as the damping medium, the somewhat lowered maximum transmissibility at 78 was secured. A compound having a coefficient of viscosity of about 2,000,000 centistokes applied under pressure of 7.0 pounds per square inch, yielded maximum transmissibility 79. Point 80 was established using single layers of the aforesaid doubly-coated paper at the eight damping positions shown to be available in the FIGURE 9 construction, and bolts spaced by two inches were also distributed along the structure to force the steel strips against the cross-legs of the aluminum core. The infinite damping point 81 corresponds to the peak of curve 74 in FIGURE 10. While the characteristic 76 does not intercept the further optimized condition at point 82, which corresponds to the peak of curve 73 in FIGURE 10, this simply reflects the influence of other data secured under the particular evaluation conditions chosen, but which it is not necessary to reproduce here, and the approximating curve 76 is shown principally for its clear general trend as the damping is altered.

One manner in which a simple angle element may be damped is illustrated in FIGURE 12, the mutually perpendicular core sides 83 and 84 being centrally channelled in directions parallel with the planes of the respective sides. Strip inserts 85 and 86, which are of relatively high modulus of elasticity and are of rectangular cross-section complementing that of the two channels, are fully recessed in the channels and separated from the core surfaces by a suitable permanently viscous and adhesive damping medium 87. Where through bolts or rivets are to be fastened along the sides of the angle element, and there is likelihood that the inserts will be shorted with the core, a construction such as that of FIGURE 13 is particularly advantageous. Angle element 88 there has each of its mutually perpendicular sides 89 and 90 longitudinally channelled, as by machining or by original extrusion, along the outside at five positions. Rod inserts 91 and 92 in the two sets of five channels are each separated from one another by partitions 93 and 94, respectively, and are surrounded by damping medium 95 of the aforesaid character. Side plates 96 and 97 complete the core assembly by covering the plural recessed inserts and by providing further core surfaces across which viscous shear damping forces may be developed. Each of the sides of this angle element may be pierced by fasteners such as rivets 98 at positions other than nodes along one longitudinal path without impeding the damping function of more than a single one of the sets of inserts 91 and 92. The remaining inserts then operate to achieve the desired damping. Rivets 98 are shown to fasten auxiliary brackets 99 and 100 to the main angle element, although it will be understood that such angle elements may be fastened to one another or to other main structural members in like manner also without destroying the self-damping characteristics.

A portion of a constructional plate member is depicted in FIGURE 14, with parts cut away to expose the interior insert arrangements which impart self-damping characteristics. The core of this member is comprised of three parallel plates 101, 102 and 103, such as aluminum, which possesses a first modulus of elasticity value, core plates 101 and 103 being channelled to have integral spaced parallel ridges 101′ and 103′ in engagement with the opposite surfaces of intermediate plate 102. Between the longitudinal channel ridges 101′ of core plate 101, and intermediate plates 101 and 102, there is disposed a plurality of thin parallel strip inserts 104 which are of a higher modulus of elasticity and all of which extend in a first longitudinal direction for the full length of the member in that direction. Like parallel strip inserts 105 are mated with the core portion by being disposed between the middle and lower core plates 102 and 103, and extend in a second longitudinal direction perpendicular to that of the other set of strip inserts 104. The mutually perpendicular orientations of the inserts 104 and 105 not only imparts greater structural rigidity to the member in all bending directions than would be the case if they were all parallel, but it results in improved self-damping under certain modes of vibration sought to be established by externally applied excitation forces. That is, with the mutually perpendicular orientation, the necessary slip between core plates and inserts will be insured even though the core flexures do not cause longitudinal bending of one set of strip inserts. Permanently viscous damping medium 106 surrounds each strip insert to promote self-damping effects. Provision of multiple strip inserts, each having certain independence of the others in flexure and slip, results in the capability of better suppressing vibration or transient shock under varied conditions. Further, the composite plate member may be clamped or fastened at a number of positions, thereby shorting a few of the small strip inserts with the core, without significantly imparing optimum self-damping characteristics occasioned by the many remaining inserts. Fasteners, such as rivets 102′ passing through the channel ridges 101′ and 103′, cause the core plates 101, 102 and 103 to become substantially rigidly united and promote their functioning as a single core element.

In the channel member 107 of FIGURE 15, the extruded aluminum core 108 is provided with four rectangular longitudinally-extending external grooves 109 on its base portion, as well as with corresponding grooves 110 and 111 on its two sides 112 and 113, respectively. Pairs of square steel rod inserts 114 occupy these grooves, running their full length, and substantially filling the grooves except for the thin film of permanently viscous damping medium 115 which is interposed between all adjacent surfaces. All of the inserts cooperate in suppressing vibrations in all directions transverse to the longitudinal axis of the member, the self-damping being occasioned in the manner already discussed. In some applications, the adhesiveness of damping material 115 may suffice to preserve the member in assembled condition, and, in others, a complementary-shaped core member 116 may be mated with core 108 to at least partially envelop it, to afford a smooth outer cover, to provide a convenient mounting or fastening means and to further promote self-damping actions by way of its inner surfaces disposed opposite the outer surfaces of the various inserts. Member 116 may instead perform a damping function like that of the inserts, in which instance it is somewhat loosely mated with the core portion 108 such that it is longitudinally slidable therealong responsive to flexural movements and dissipates energy in the thin layer of viscous medium appearing along its inner surfaces, as designated by reference character 116'. Member 116 is then also preferably of material having a modulus of elasticity greater than that of core portion 108.

Concerning the nature of the relative movements which develop optimum damping, the intentianally exaggerated portrayals in FIGURES 16 and 17 are noteworthy. Core portion 117 is there provided with a plurality of parallel longitudinally-extending openings 118 and 119 which are in two separate rows, one above and one below the mid-level 120 of the core. Cylindrical rod inserts 121 and 122 are disposed in the two rows of openings, are surrounded by permanently-viscous damping medium 123, and are preferably of higher modulus of elasticity than the material of core 117. Upon downward deflection of one end of this member, with the other end held in a fixed position by a clamp 124 as shown in FIGURE 16, the integral core 117 flexes as a single entity, with the portions above the mid-position 120—120 tensioned and stretched, while at the same time the portions below the mid-position are compressed. The inserts 121 and 122, on the other hand, are merely deflected while preserving their original lengths, and relative longitudinal slip is developed between oppositely-disposed surfaces of the inserts and cooperating core openings. This slip occasions the aforementioned type of viscous shearing in the film-like medium. The exaggerated illustration of the relative orientations of ends of the inserts and core, in both the cross-sectioned side and pictorial end views of FIGURES 16 and 17, indicate that the ends of the top row of inserts 121 will become recessed into the stretched core portion while the ends of the lower row of inserts 122 will protrude slightly from the compressed core portion as the deflection proceeds. Coulomb damping effects, resulting from light frictional engagement between inserts and core which does not, nevertheless, prevent the necessary slip, is also advantageous, provided the coulomb damping effects are proportioned to yield substantially optimum damping. At the neutral mid-position 120—120, there would be no substantial slip experienced and it is thus seen that the maximum damping effects are developed at insert positions removed as far as possible from the neutral axis of bending. This applies to designs other than that of the member in FIGURES 16 and 17, of course, and the constructions in FIGURES 1, 4, 13 and 15, for example, are in harmony with the objective of disposing the inserts at positions as remote from neutral bending axes as other factors will permit.

The composite assembly of composite self-damped structural members which appears in FIGURE 18 exhibits several important aspects of practice of these teachings. One of the damped structural members, 125, comprises an angle beam somewhat similar to that of FIGURE 13 in which the narrow grooves 126 in the aluminum core sides 127 and 128 each contain a pair of steel wires 129 as well as the permanently viscous damping medium. One side, 128, of the angle member is fastened to a structural plate member 130 by way of rivets 131, the latter failing to short out any substantial quantity of the distributed inserts within this side. Member 130 likewise possesses certain self-damped characteristics which are derived through interposition of films of the permanently viscous damping medium 132 between adjacent surfaces of the core plate and insert elements 133, 134, 135, 136, and 137 of which the member 130 is in part fabricated. The relatively fixed core of this composite member includes the three core plate members 133, 135 and 137, which may be of aluminum, for example, while the strip insert members 134 and 136, are preferably of material having a higher modulus of elasticity. Sets of parallel strip inserts 134 and 136 extend in directions which are perpendicular to one another and are disposed within accommodating channels of plates 133 and 137 defined by the parallel plate ridges 133' and 137', respectively. When fasteners such as through-bolts 138 and 139 are added at locations other than those where the channel ridges overlap, as for the purpose of connecting member 130 with a bracket 140, special provision may be made to promote maximum slip and a high degree of damping. This is accomplished using a pair of thick annular sleeves or spacers 141 and 142 through which the bolt 139 passes and firmly secures the ends of the spacers to the core plates 133, 135 and 137 in the manner illustrated. The insert strips 134 and 136 are pre-formed to accommodate the spacers and, in turn, to afford clearance about them which permits such relative slip as can be expected to occur. Accordingly, the openings 143 and 144 in insert members 134 and 136, respectively, are shown to be somewhat larger than the spacers therein, and the viscous damping medium preferably occupies the voids between the spacers and inserts. Spacers 141 and 142 function as part of the core assembly, preserving the core plates 133, 135 and 137 in fixed relationship and, thereby, promoting maximum slip between the inserts and core. It will be apparent that the fastenings and spacings may be implemented with other forms of hardware and with other machining or pre-forming of the insert and core members.

It has been stated earlier herein that in a given self-damped composite structural member large resonant responses will occur if the medium between relatively movable core and insert portions is either of zero or infinite coefficient of viscosity values, the resonant frequency values then being different. And, there is found to exist an optimum damping condition under which the maximum response at the associated resonant frequency will be a minimum value. The actual minimum value of resonant response is discovered to be controlled by a relationship which is particularly useful in arriving at optimum constructions, and, for convenience, this relationship shall here be termed a factor "N," which is found to be capable of expression as follows:

$$N = \left(\frac{f_\infty}{f_0}\right)^2 - 1$$

where, $f_\infty$ is resonant frequency with infinite damping, and $f_0$ is resonant frequency with zero damping. As N increases in value, the maximum resonant response is lowered, and it is thus important to optimum arrangement of any structure that N be caused to be of the highest convenient value. In determining the frequencies involved for the case of any given structural member, the loading to be experienced or absence of loading to be carried by the beam are considered. If the load is large in relation to weight of the member, and is concentrated, natural frequency can be determined from knowledge of the mass of the load and the static stiffness of the member. Where concentrated load is negligible, natural frequency may be calculated through simple extension of existing theory for beams and the like. Through such calculations, it is further established that N is a function of the flexural rigidity (EI) of the member for the zero and infinitely damped conditions:

$$N = \frac{(EI)_\infty}{(EI)_0} - 1$$

where E is the modulus of elasticity, I is the area moment of inertia of each area taken about the axis of its motion, and the subscripts $\infty$ and 0 denote the infinite and zero damped cases, respectively.

In the instance of zero damping, the moment of inertia of each individual core and insert element is taken about the neutral axis of that area which will pass through the center of gravity of that area. For the case of infinite damping, however, the moment of inertia of each individual core and insert member must naturally be taken about the neutral axis of the composite member being considered. Flexural rigidity includes that of the core material and insert material, such that for zero damping:

$$(EI)_0 = (E_c I_c) + \Sigma(E_i I_i)_0$$

and for infinite damping:

$$(EI)_\infty = (E_c I_c)_0 + (E_c A_c d_c^2) + \Sigma(E_i I_i)_0 + \Sigma(E_i A_i d_i^2)$$

where

A is cross-sectional area of portion considered,
d is transfer distance from the neutral axis of a given area to the neutral axis of the composite member,
and c and i are subscripts denoting the core and insert portions, respectively.

Substituting, the equation for N in a symmetrical or non-symmetrical member becomes:

$$N = \frac{E_c A_c d_c^2 + \Sigma(E_i A_i d_i^2)}{(E_c I_c)_0 + \Sigma(E_i I_i)_0}$$

The summation sign, $\Sigma$, indicates that all of a plurality of inserts will be included in the calculation. If the core structure is comprised of more than one material, the calculations may be revised to take this into consideration. Where the inserts are of different materials, the summations become:

$$\Sigma E_i A_i d_i = (E_1 A_1 d_1^2 + E_2 A_2 d_2^2 + \ldots)_i$$

and $$\Sigma E_i I_i = (E_1 I_1 + E_2 I_2 + \ldots)_i$$

where the terms are summed for the different materials designated by subscripts 1, 2, etc., over the total number of inserts. The equation for N is of course simplified for a symmetrical beam section having a neutral axis for the core which coincides with the neutral axis of the composite member, i.e., $d_c = 0$. Also, there is simplification where the inserts are of the same material, which is a convenient fabrication aid, and where each insert is placed at the same distance from the neutral axis of the composite member. If then the total number of similar inserts is designated by $n_i (i = 2, 4, 6, \ldots)$, and the insert radius of gyration is expressed by $$r_i = \sqrt{\frac{I_i}{A_i}}$$

the equation for N is transformed:

$$N = \left(\frac{d_i}{r_i}\right)^2 \left[\frac{1}{1 + \frac{1}{n_i}\left(\frac{I_c}{I_i}\right)\left(\frac{E_c}{E_i}\right)}\right]$$

The largest values of N being indicative of minimized magnification of resonant response, this equation shows that N is advantageously increased by making the modulus of elasticity of the inserts, $E_i$, large in relation to the modulus of elasticity of the core, $E_c$. N is also increased by reducing the moment of inertia of the core, $I_c$. Inasmuch as the transfer distance of the insert, $d_i$, is squared in this relationship, increase in this parameter has a large effect upon the N factor, and this signifies that the inserts should be as far removed from the neutral axis as possible. The neutral axis of any composite section made up of different materials is that about which the total moment of area-modulus is zero, that is:

$$\Sigma E_j A_j d_j = 0$$

where $d_j$ is the distance from the center of gravity of each individual area, $A_j$, having the modulus of elasticity, $E_j$, to the neutral axis of the composite area.

If one chooses any arbitrary axis about which to take moments, then the distance to the neutral axis of the composite area measured from this arbitrary axis is given by $\bar{\delta}$ as follows:

$$\bar{\delta} = \frac{\Sigma E_j A_j \delta_j}{\Sigma E_j A_j}$$

where $\delta_j$ is the distance from the center of gravity of the area $A_j$ to the axis about which moments are being taken. If the composite area is made up of portions having the same modulus of elasticity, then the neutral axis passes through the center of gravity of the area section and $\bar{\delta}$ merely defines the position of the center of gravity of the area with respect to some arbitrary reference.

In terms of the factor N for a member, the maximum transmissibility, $T_{max.}$, optimum resonant frequency, $W_r$, and optimum damping constant, $C_{op.}$, are found to be substantially as follows:

$$T_{max.} = 1 + \frac{2}{N}$$

$$W_r = W_0 \sqrt{\frac{2(N+1)}{N+2}}$$

where $W_0$ is the resonant frequency with zero damping, and $$C_{op.} = \frac{N}{4(N+1)}\sqrt{2(N+2)}$$

Substantially optimum values of the corresponding coefficient of viscosity, $\mu_{op.}$, for the composite members may be established empirically, as in the cases discussed hereinbefore wherein materials having different known coefficients of viscosity were evaluated in determining the characteristic response curves. The same information may be derived mathematically from knowledge of the geometry and dimensions of a given composite structure, thickness of damping layer which is to be used, dimensions of the interfaces between core and insert portions, and moduli of elasticity and mass density of the core and insert portions. Viscous materials used should of course have substantially permanent coefficient of viscosity characteristics over required service life of the self-damped members, and this may vary with the intended applications.

Based upon these recognitions and teachings, self-damped structures may be produced in a variety of sizes and shapes and with capability of withstanding and suppressing transient or sustained vibratory excitation forces. Composite structural elements may be provided in a number of geometrical shapes, such as those which are of circular cross-section or of the illustrated forms, or may instead have irregular configurations. High static loadings may be maintained, and substitution may be readily made for many homogeneous structural members of conventional external geometry and mounting or fastening requirements. Accordingly, it will be understood that the specific embodiments of the invention herein disclosed are intended to be of a descriptive rather than a limiting character, and various changes, combinations, substitutions, or modifications may be effected in practice of these teachings without departing either in spirit or scope from this invention in its broader aspects.

What I claim as new and desire to secure by Letters Patent of the United States is:

1. A self-damped composite member subject to flexural movements responsive to excitation of vibratory character comprising a first portion having all parts thereof substantially rigidly united, a plurality of separate portions each mated with said first portion over a different elongated path, one of each of said mated portions having an elongated passageway therein extending in a direction substantially parallel with a plane of said flexural movements and the other of each of said mated portions being at least partly enveloped within said passageway over one elongated path with external surfaces of said other portion adjacent and longitudinally slidable in relation to internal surfaces of said passageway over said elongated path, said separate portions having a flexural rigidity different from that of said first portion, and a substantially permanently viscous damping medium interposed in a thin layer between said surfaces inside said passageway, said viscous medium having the characteristic of adhesiveness to said surfaces.

2. A self-damped composite member subject to flexural movements responsive to excitation of vibratory character comprising a core portion having all parts thereof substantially rigidly united, said core portion having at least one elongated passageway therein extending in a direction substantially parallel with a plane of said flexural movements, a plurality of elongated insert members disposed within and substantially filling the cross-section of said elongated passageway, external surfaces of a plurality of said insert members being disposed adjacent and longitudinally slidable in relation to internal surfaces of said core portion passageway, and means for dissipating energy responsive to relative longitudinal sliding movement between surfaces of said passageway and insert members upon occurrence of said flexural movements.

3. A self-damped composite member subject to flexural movements responsive to excitation of vibratory character comprising a core portion having all parts thereof substantially rigidly united, said core portion having at least one elongated passageway therein extending in a direction substantially parallel with a plane of said flexural movements, a plurality of elongated insert members disposed within said elongated passageway with external surfaces thereof adjacent and longitudinally slidable in relation to internal surfaces of said core portion passageway, and a substantially permanently viscous medium interposed as a thin layer between said external surfaces of said insert members and said internal surfaces of said passageway and between adjacent external surfaces of said insert members, said viscous medium having the characteristic of adhesiveness to said surfaces of said core portion and insert members and being of thickness which retain said medium and said insert members within said passageway.

4. A self-damped composite member subject to flexural movements responsive to excitation of vibratory character comprising a core portion having all parts thereof substantially rigidly united, said core portion having a plurality of elongated and susbtantially linear passageways therein each extending in a direction substantially parallel with a plane of said flexural movements, at least one elongated and substantially linear insert member disposed within each one of said elongated passageways and extending substantially the full length thereof with external surfaces thereof adjacent and longitudinally slidable in relation to internal surfaces of said one of said passageways, and means for dissipating energy responsive to relative longitudinal sliding movements between surfaces of said passageway and said insert members upon occurrence of said flexural movements.

5. A self-damped composite member subject to flexural movements responsive to excitation of vibratory character comprising a core portion having all parts thereof substantially rigidly united, said core portion having a plurality of elongated passageways therein, at least one of said passageways extending in one direction susbtantially parallel with a plane of said flexural movements and at least another of said passageways being spaced from and extending perpendicularly to said one passageway, at least one elongated insert member disposed within each one of said elongated passageways with external surfaces thereof adjacent and longitudinally slidable in relation to internal surfaces of said one of said passageways, and means for dissipating energy responsive to relative longitudinal sliding movements between surfaces of said passageways and said insert members upon occurrence of said flexural movements.

6. A self-damped composite member subject to flexural movements responsive to excitation of vibratory character comprising a core portion having a cross-section composed of a plurality of parts which are substantially rigidly united and impart a first modulus of elasticity characteristic to said core portion, said core portion having a plurality of elongated passageways therein each extending in a direction substantially parallel with a plane of said flexural movements, at least one elongated insert member disposed within each one of said elongated passageways with external surfaces thereof adjacent and longitudinally slidable in relation to internal surfaces of said one of said passageways, each said insert member having a higher value of modulus of elasticity charcteristic than that of said core portion, and means for dissipating energy responsive to relative longitudinal sliding movements between surfaces of said passageways and said insert members upon occurrence of said flexural movements.

7. A self-damped composite member subject to flexural movements responsive to excitation of vibratory character comprising a core portion having all parts thereof substantially rigidly united, said core portion having a plurality of elongated openings through the interior thereof extending substantially linearly in a direction substantially parallel with a plane of said flexural movements, at least one elongated and substantially linear insert member disposed within each one of said elongated openings and extending substantially the full length thereof with external surfaces thereof adjacent and longitudinally slidable in relation to internal surfaces of said one of said openings, said openings being substantially filled by said relatively slidable insert members, and means for dissipating energy responsive to relative longitudinal movements between surfaces of said openings and adjacent insert members upon occurrence of flexural movements.

8. A self-damped composite member subject to flexural movements responsive to excitation of vibratory character comprising a core portion having all parts thereof substantially rigidly united, said core portion having a plurality of elongated openings through the interior thereof extending substantially linearly in a direction substantially parallel with a plane of said flexural movements, at least one elongated and substantially linear insert member disposed within each one of said elongated openings and extending substantially the full length thereof with external surfaces thereof adjacent and longitudinally slidable in relation to internal surfaces of said one of said openings, and a substantially permanently viscous medium distributed in a thin layer between and adhering to said surfaces of said openings and insert members throughout the length of each of said insert members, whereby energy of said relative longitudinal sliding movements between said surfaces responsive to occurrence of said flexural movements is dissipated through said viscous medium.

9. A self-damped composite member subject to flexural movements responsive to excitation of vibratory character comprising a core portion having all parts thereof substantially rigidly united, said core portion having a plurality of elongated openings through the interior thereof extending substantially linearly in a direction substantially parallel with a plane of said flexural movements and at positions near extremities of said core portion which are displaced from the neutral bending axis of said flexural movements, at least one elongated and substantially linear insert member disposed within each one of said elongated openings and extending substantially the full length thereof with external surfaces thereof adjacent and longitudinally slidable in relation to internal surfaces of said one of said openings, and a substantially permanently viscous medium distributed in a thin layer between and adhering to said surfaces of said openings and insert members throughout the length of each of said insert members, whereby energy of said relative longitudinal sliding movements between said surfaces responsive to occurrence of said flexural movements is dissipated through said viscous medium.

10. A self-damped composite member subject to flexural movements responsive to excitation of vibratory character comprising a core portion having all parts thereof substantially rigidly united, said core portion having a plurality of elongated passageways therein extending substantially linearly in a direction substantially parallel with a plane of said flexural movements and disposed along peripheral parts of said core portion which have substantially maximum displacements from the neutral bending axis of said flexural movements, at least one elongated and substantially linear insert member disposed within each one of said elongated passageways and extending substantially the full length thereof with external surfaces thereof adjacent and longitudinally slidable in relation to internal surfaces of said one of said passageways, said insert members having higher modulus of elasticity than said core portion, and a substantially permanently viscous medium distributed as a thin layer between and adhering to said surfaces of said passageways and insert members, said layer of viscous medium being of thinness and adhesiveness which preserves said medium and inserts within said core portion.

11. A self-damped composite member subject to flexural movements responsive to excitation of vibratory character comprising a first core portion having all parts thereof substantially rigidly united, said first core portion having a plurality of elongated open-sided passageways therein extending substantially linearly in a direction substantially parallel with a plane of said flexural movements and disposed along peripheral parts of said core portion which have substantially maximum displacements from the neutral bending axis of said flexural movements, at least a second core portion fixed in relation to said first core portion and closing open sides of said passageways, at least one elongated and substantially linear insert member disposed within each one of said elongated passageways and extending substantially the full length thereof with external surfaces thereof adjacent and longitudinally slidable in relation to internal surfaces of said one of said passageways, said insert member having higher modulus of elasticity than said core portions, and a substantially permanently viscous medium distributed as a thin layer between and adhering to said surfaces of said passageways and insert members.

12. A self-damped composite structural member comprising a load-supporting core portion of relatively great length in relation to cross-sectional dimensions thereof, said core portion having all parts thereof substantially rigidly united and being subject to flexural movements responsive to excitation of vibratory character, said core portion having a plurality of elongated passageways therein of substantially uniform cross-section extending substantially linearly in a direction substantially parallel with the longitudinal axis of said core portion throughout substantially the full length thereof, at least one insert rod of substantially said full length and of substantially uniform cross-section disposed within each one of said passageways with external surfaces thereof adjacent and longitudinally slidable in relation to internal surfaces of said one of said passageways, the cross-sections of said insert rods in said passageways being slightly less than the cross-sections of said passageways, whereby said insert rods are free to slide in relation to said core portion responsive to said flexural movements of said core portion, and means for dissipating energy responsive to relative longitudinal sliding movements between said surfaces of said insert rods and passageways.

13. A self-damped composite structural member as set forth in claim 12 wherein said passageways are of substantially rectangular cross-section, wherein said insert rods are of substantially rectangular cross-section complementing the passageway cross-sections, and wherein said means for dissipating energy comprises subtantially permanently viscous medium interposed between said external surfaces of said insert rods and said internal surfaces of said passageways.

14. A self-damped composite structural member as set forth in claim 12 wherein said passageways comprise openings of substantially circular cross-section through said core portion, wherein said insert rods are of substantially circular cross-section, and wherein said means for dissipating energy comprises substantially permanently viscous medium interposed between said external surfaces of said insert rods and said internal surfaces of said passageways.

15. A self-damped composite structural member as set forth in claim 12 wherein said insert rods in said passageways comprise a plurality of wires in each of said passageways, and wherein said means for dissipating energy comprises substantially permanently viscous medium interposed between adjacent external surfaces of said wires and between adjacent external surfaces of said wires and interal surfaces of said passageways.

16. A self-damped composite structural member as set forth in claim 12 wherein said insert rods have a higher modulus of elasticity than said core portion, and wherein said insert rods and passageways are disposed near outer extremities of said core portion which are furthest removed from the neutral bending axis of said flexural movements.

17. A self-damped composite structural member as set forth in claim 16 wherein the material of said core portion includes aluminum, and wherein said insert rods are made of steel.

18. A self-damped composite member comprising a first core portion having all parts thereof substantially rigidly united and having a plurality of spaced parallel open channels recessed therein separated by ridges of the material of said core portion and extending substantially the full length of said core portion, a second core portion having surfaces abutting the top surfaces of said ridges and thereby closing said open channels, at least one elongated insert member disposed within each one of said channels and extending substantially said full length thereof with external surfaces thereof adjacent and longitudinally slidable in relation to internal surfaces of said channels, means for dissipating energy responsive to relative longitudinal sliding movements between said surfaces of said insert members and channels, and means fastening said first and second core portions together while leaving said insert members free for said relative longitudinal sliding.

19. A self-damped composite member as set forth in claim 18 further comprising a third core portion having a plurality of spaced parallel open channels recessed therein separated by ridges of the material of said third core portion, said third core portion being disposed with said second core portion abutting the top surfaces of said ridges thereof, at least one elongated insert member disposed within each one of said channels of said third core portion and extending substantially the full length thereof with external surfaces thereof adjacent and longitudinally slidable in relation to internal surfaces of said channels of said third core portion, said channels and insert members of said third core portion being disposed perpendicular to said channels and insert members of said first core portion, and wherein said fastening means fasten said first, second and third core portions together while leaving said insert members free for said relative longitudinal sliding.

20. A self-damped composite member as set forth in claim 18 wherein said insert members have a higher modulus of elasticity than said core portions, and wherein said means for dissipating energy comprises substantially permanently viscous damping medium interposed in a thin layer between said adjacent surfaces of said insert members and channels.

References Cited in the file of this patent

UNITED STATES PATENTS

| | | |
|---|---|---|
| 2,426,359 | Lankheet | Aug. 26, 1947 |
| 2,514,140 | O'Connor | July 4, 1950 |
| 2,584,222 | O'Connor | Feb. 5, 1952 |
| 2,636,399 | O'Connor | Apr. 28, 1953 |
| 2,930,455 | Williams | Mar. 29, 1960 |

FOREIGN PATENTS

| | | |
|---|---|---|
| 513,171 | Great Britain | Oct. 5, 1939 |